US008244614B2

(12) United States Patent
Reich et al.

(10) Patent No.: US 8,244,614 B2
(45) Date of Patent: Aug. 14, 2012

(54) METHOD AND SYSTEM FOR AUTOMATED TRANSACTION COMPLIANCE PROCESSING

(75) Inventors: Hans-Linhard Reich, Middletown, NJ (US); Gary Hom, Berkeley Heights, NJ (US); Tanuja Prasad, New York, NY (US)

(73) Assignee: Goldman, Sachs & Co., New York, NY (US)

( * ) Notice: Subject to any disclaimer, the term of this patent is extended or adjusted under 35 U.S.C. 154(b) by 0 days.

(21) Appl. No.: 12/966,886

(22) Filed: Dec. 13, 2010

(65) Prior Publication Data

US 2011/0282771 A1 Nov. 17, 2011

Related U.S. Application Data

(63) Continuation of application No. 09/877,439, filed on Jun. 8, 2001, now Pat. No. 7,873,560.

(60) Provisional application No. 60/210,431, filed on Jun. 8, 2000.

(51) Int. Cl.
*G06Q 40/00* (2006.01)

(52) U.S. Cl. .......... 705/35; 705/7.29; 705/36 R; 705/38; 709/226

(58) Field of Classification Search ..................... 705/38, 705/7.29, 35–36 R; 709/226
See application file for complete search history.

(56) References Cited

U.S. PATENT DOCUMENTS 5,893,079 A * 4/1999 Cwenar ........................ 705/36 R

OTHER PUBLICATIONS ("Automation Helps Relieve Compliance Headaches"; Merrin, Seth, LeGoff, Eric. Corporate Controller. New York: Jul./Aug. 1992. vol. 4, Iss. 6; p. 34, 3 pg.).*
("Compliance tools help keep track of buy-sider trader"; Tom Fernandez; Wall Street & Technology; New York; Jul. 1998. vol. 16, Iss. 7; p. 22, 2 pgs.).*

* cited by examiner

*Primary Examiner* — Harish T. Dass
(74) *Attorney, Agent, or Firm* — Perkins Coie LLP (57) ABSTRACT

A system for automated transaction compliance processing comprises a list server providing access to one or more lists of securities with trading restrictions and a rules engine which processes compliance requests to determine if, based upon the relationship between the requesting party and the company on behalf the compliance is being performed, the transaction is permissible. Compliance determinations are made using a set of predefined compliance rules. When a request is evaluated, a compliance rule set indicating which rules are to be evaluated at that time is generated in accordance with a party profile indicating the relationship between the party and the company. A message indicating whether or not the transaction complies with trading restrictions is then returned. The system can be stand-alone or integrated with an electronic trading system. The compliance processor can also be used to analyze reports to ensure that the report contents comply with confidentiality requirements prior to public release of the report.

13 Claims, 5 Drawing Sheets

METHOD AND SYSTEM FOR AUTOMATED TRANSACTION COMPLIANCE PROCESSING

CROSS REFERENCE(S) TO RELATED APPLICATIONS

This application is a Continuation of and claims priority under 35 U.S.C. §120 to U.S. Non-Provisional application Ser. No. 09/877,439 filed Jun. 8, 2001 now U.S. Pat. No. 7,873,560 entitled, "Method and System for Automated Transaction Compliance Processing," the entire contents of which are herein expressly incorporated by reference, which in turn claims priority under 35 U.S.C. §119 to U.S. Provisional Application Ser. No. 60/210,431 filed on Jun. 8, 2000 and entitled "Automated Transaction Compliance."

FIELD OF THE INVENTION

This invention relates to a method and system for automating transaction compliance checks and, in particular, to a system that enforces trading restrictions placed upon a specific party on the basis of their relationship to an entity such as a financial services institution.

BACKGROUND

Many companies require that employees, clients, and other relations perform transaction compliance checks before they trade in securities. Financial institutions, law firms, corporations, and other types of entities often are in possession of confidential information that relates to the value of a security. Depending upon the employee's position and the company's knowledge, the employee should not be allowed to make certain transactions because the employee may have knowledge which would give an unfair trading advantage. Similar restrictions can apply to clients of the company and to transactions made on behalf of the company itself. Transaction restrictions are generally imposed for legal reasons or on policy grounds, e.g., because the transaction would give the appearance of impropriety.

Conventionally, such a company will employ at least one trade compliance officer ("TCO") who is responsible for ensuring that no illegal or improper transactions are made by company employees, customers, or on behalf of the company itself. For example, an employee who wants to make a securities or other financial transaction must first notify the TCO within the company. This is usually done by telephone or a written or e-mailed request. Once the TCO receives the request, the TCO compares the underlying security with a list of other companies with which the employee and/or the present company are currently involved. Some restricted transaction lists can be publicly available while others contain restrictions based on facts not known to the public.

The TCO is responsible for determining whether the employee can trade in the security. In making this determination, the TCO typically considers whether the company is involved with the security or the issuer, what position the employee holds, what confidential information the employee could be privy to, as well as other factors. Once this evaluation is complete, the TCO notifies the employee with the results of the compliance check. The TCO can indicate that the transaction is approved or that it violates one or more trading restrictions because the company is to closely involved in the underlying security and the employee's relationship with the company makes it inappropriate or illegal for them to transact in the security. In some instances, a transaction can be approved but only under limited circumstances. For example, the TCO may allow the employee to buy the security but only after a waiting period of thirty days. In general, however, the employee must wait until the TCO clears the proposed transaction before proceeding.

The process of examining and responding to the transaction requests is time consuming and can delay the employee from investing at opportune times. Often, most or all of the compliance checking is performed manually. This limits the number of transactions which can be evaluated in a given time. Often, it can be impossible to complete the transaction check prior to the execution of the transaction. This can result in the difficult situation of determining that a transaction is non-complying after the fact and having to back-out the transaction or take other corrective measures.

Some attempts have been made to automate the compliance process. Certain systems focus on determining whether a proposed transaction complies with limitations placed upon the contents of a given portfolio, such as legal restrictions or restrictions related to the goal of the portfolio owner. Such a system is disclosed in U.S. Pat. No. 5,893,079. The compliance system disclosed in the '079 patent is very basic and does not address the performance and other issues which must be addressed to implement a system that can handle compliance checking on trades that can be made by a large number of corporate employees, customers, or other relations, each of which may have different applicable compliance rules. Other systems are available to at least partially automate compliance checking for trades by employees and customers but these system also do not have an architecture or methodology which is well suited for high volume and fast response time while also providing a flexible implementation environment.

SUMMARY OF THE INVENTION

The present invention provides a method and system for automating transaction compliance checks via a computer communications system. In a particular implementation, the compliance system is comprised of a rules processing engine that has access to predefined sets of compliance rules, profile information used to determine which compliance rules apply to a given compliance request, as well as other information, such as trading history for use in determining whether a transaction complies with minimum hold or other temporal conditions. The restrictions are imposed by a corporate entity or other organization and are stored on one or more lists. Restrictions can be based upon public or private information.

A list server is connected to the list storage areas and the rules engine and is configured to process the information in the restriction lists and indicate, in response to a query from the rules engine, which restrictions rare relevant to a given request. In some lists, the restrictions can have associated severity levels. If an instrument appears multiple times in a single list but with different severity levels, the list server preferably returns only the most severe entry from that list.

The rules engine is configured to perform compliance checking in response to a compliance request made on behalf of a party such as a request to sell stock from an employee account, and determine if the proposed transaction or other action would be permissible given the restrictions which have been established by the entity and the relationship between the party and the entity. A compliance request is initially received which indicates the particular instrument (or instrument issuer) at issue and the party that must be in compliance. The party can be identified directly or indirectly referencing, for example, to a trading account.

The restrictions on the specified instrument are retrieved, e.g., via the list server and a set of compliance rules is accessed. The compliance rules can be selected, at least in part, with reference to a profile for the party that indicates various sets of rules that should be considered based upon the particular relationship between the party and the entity and possibly other factors. The rules identified by the compliance rule set are then evaluated in turn until it is determined whether or not a compliance rule will be violated. A message is output indicating wither the request complies with the various applicable restrictions and rules or not. In some situations, a severity value associated with a compliance rule can indicate that request might be permissible but only with additional authorization. In such a situation, the message can indicate that a TCO officer must be contacted.

Various features can be implemented in the system to enhance functionality and increase performance. In one implementation, compliance rules are assigned a specified priority which is used to determine the order in which the rules are evaluated. Preferably, rules are evaluated in an order which will detect non-complying situations based on publicly available information before detecting non-compliance based on restrictions related to private information. This maximizes the number of parties which, when being informed about a non-complying request, can be given a complete explanation o the reasons for non-compliance.

According to a further aspect of the invention, the compliance rule set is dynamically generated on an as-needed basis in accordance with the profile of the subject party of the request. Preferably, a baseline rule set is provided along with a plurality of additional rule sets. The compliance rule set is comprised of a combination of the baseline set and one or more one additional rule sets selected in accordance with the party's profile. Rule exceptions can also be provided, e.g., on a global, department, or party basis, and used to remove rules from the compliance set or otherwise disable them from being considered when determining compliance for a given party.

The compliance system can be implemented as a stand-alone system to which parties direct compliance requests, e.g., by submitting a form via an intranet, the Internet, or e-mail, and responses are returned to the submitter. In another implementation, the compliance system is integrated into an electronic trading system and serves to ensure that, before the trades are executed, no relevant trading restrictions are violated.

According t yet a further feature of the invention, the system logs rejected requests. On a periodic basis, the rejected requests can b re-evaluated to determine if conditions have changed such that the request has become permissible. If so, a message can be sent to the requester (and/or the subject party if different) indicting that the request is in compliance.

A primary embodiment of the present invention is to evaluate transaction requests made against employee, client, or corporate accounts, and ensure that the transaction does not violate any specified trading restrictions. In a variation of the present invention, the compliance system can also be used to clear research documents priori to pubic release. A preprocessing system can be provided to automatically scan a research document to identify names of companies, financial instruments, and other key words. Alternatively, the key words can be selected manually. A compliance request is made to the compliance system for each of the identified entities wherein the party to the request is the company issuing the report. The identified entities are then processed by the compliance system using the appropriate compliance rule set, to determine if any restrictions would be violated references in the document. If so, the author of the document can be alerted to ensure that references to the particular company or security are removed or based only upon publicly available information.

The automated transaction compliance system of the present invention is configured to quickly resolve compliance issues to permit employees and others to perform personal transactions more quickly and have more control over how and when investment decisions are made. The system can also be used to clear proposed transactions made by customers of the company or on behalf of the company itself. The automated transaction compliance system reduces the duties of the TCO since the majority of potential transactions can be handled automatically with only a limited number requiring manual evaluation to consider issues not well suited for an automated system. Further advantages will be recognized by those of skill in the art.

BRIEF DESCRIPTION OF THE FIGURES

The foregoing and other features of the present invention will be more readily apparent from the following detailed description and drawings of illustrative embodiments of the invention in which.

DETAILED DESCRIPTION OF THE PREFERRED EMBODIMENTS

Figure 1:
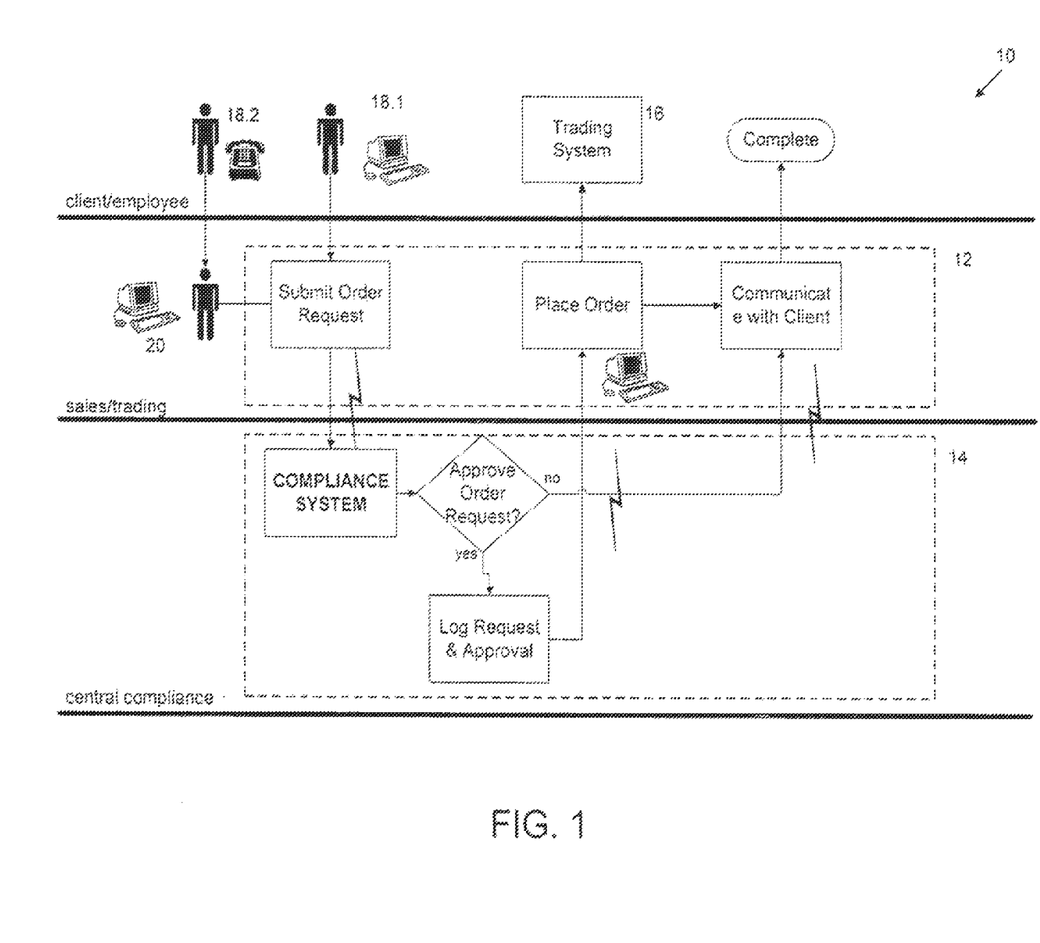
FIG. 1 is a high level illustration of an automated order approval system also showing relevant data flow.

FIG. 1 is a high level illustration of an automated order approval system 10 further showing relevant data flow. The system 10 is comprised of an OMA module 12 and a compliance system 14 and is connected to a trading system 16. An employee, client, or other party uses a network access device, such as a computer 18.1, to submit a transaction request for a given account. Alternative mechanisms can be provided for submitting transaction requests, such as a telephonic interface 18.2 to an automated or manned input system 20, and the particular form of the input is not critical.

To standardize input, preferably a transaction request form is provided. This form can be in HTML, spreadsheet format, word processor format, or other desirable formats to simplify information transfer. The information provided with typically include the party's name, account number, the identity of the security at issue, and other information related to the transaction and which may be necessary to complete the compliance check and execute the transaction.

When an order is submitted, details about the transaction and the party making it are forwarded from order processing system 12 to the compliance system 14 in the form of a compliance request. The compliance system 14 processes the request and determines whether any trading restrictions are in place for the identified security and if the party's relationship with the corporate entity on behalf the compliance check is being performed (referred to herein simply as the company or the entity) is such that one or more the restrictions apply. If no restrictions apply, the request is approved and an approval signal or message is sent to the OMA 12 which can then place the order with an electronic trading system 16. The order can be automatically processed and forwarded to the trading system 12 and/or a separate order processing system (shown in FIG. 2). The approval can also be logged for tracking purposes.

If the request is not approved, the transaction is not executed. A response can be sent to the party submitting the transaction request indicating reasons for rejection. In addition, depending on the grounds for rejection, the request can be forwarded to a trade compliance officer ("TCO") for further consideration or a message sent to the party instruction them to contact a TCO.

Various methods can be used to integrate the compliance system 14 with an electronic trading system 12. In one embodiment, the two are tightly coupled. Trades requests are submitted normally and the compliance request is generated from within the trading system. In a more loosely coupled environment, the compliance system 14 can be implemented in an essentially stand-alone manner. Compliance requests for specific transactions are sent directly to the compliance system and the approval status of the request stored in a suitable database. If the party subsequently submits the proposed transaction to a trading system, the approval database can be accessed by the trading system to ensure that the transaction has been approved prior to its execution. Other implementations are also possible.

Figure 2:
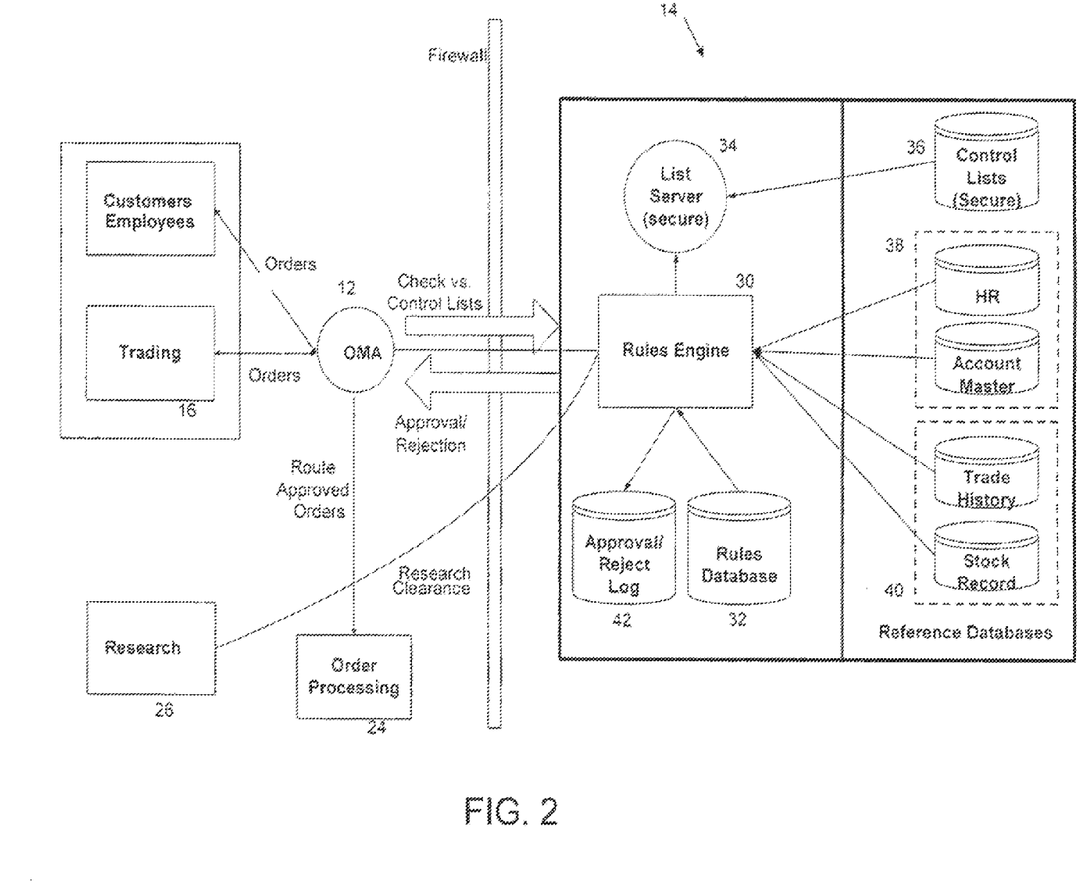
FIG. 2 is a high-level diagram showing the major elements of the automatic compliance system.

FIG. 2 is a high-level diagram showing the major elements of the automatic compliance system 14. The compliance system 14 is comprised of a rules engine 30 which is connected to a rules database 32 or other storage area containing a series of predefined rules which encapsulate various compliance rules, such as situations where a trade is not permitted. A list server 34 is connected to the rules engine 30 and is configured to receive queries identifying a specific financial instrument or instrument issuer and return information about related restrictions. Preferably, the trading restrictions are specified in one or more control lists 36 which are accessed by the list server 34.

The rules engine 30 is also connected to one or more databases 38 which contain profile information, such as a human resources database and an account database. This information relates details about the party to the request to applicable compliance rules. Profile information can be specified in a number of ways and can indicate, for example, the principle owner of an account (who can be considered to be the subject party of a compliance request related to action in the account), the party's position or relationship with the company, practice area, geographical location, types of confidential information that the party has access to, and other factors. In a preferred implementation, profiles are defined hierarchically in various broad categories, such as employee or client, department, and user ID. The specific profile used for a given party is the combination of the various hierarchical profiles which apply to the given party.

The rules engine 30 can be connected to additional databases 40 as necessary to provide the information needed to evaluate the compliance rules. Shown in FIG. 2 are a trade history database and a stock record database. Various other databases or data sources can also be provided. These additional databases can contain specify, for example, whether a relationship exists between the company and another corporation, the type of the relationship, and what confidential information has been given the employee's company.

In addition, a log database 42 can be provided to store information about one or both of approved and rejected requests. The log can be analyzed, for example, to detect unusual trading patterns, and used to document compliance efforts, e.g., for regulatory reasons. Such a log can be used for various other reasons as will be recognized by those of skill in the art.

Also shown in FIG. 2 is a research module 26. As discussed more fully below with respect to FIG. 5, one concern of financial institutions and other organizations which issue public statements, such as earning estimates, is to insure that when such statements are released, they are based only upon publicly available information. In accordance with an additional aspect of the invention, the research model 26 provides a mechanism to analyze references made in a research document and identify referenced entities and submit compliance requests to the compliance system 14 to determine if transaction (or other) restrictions are in place. This information can be used as a signal that the report may contain or be based upon non-public information and appropriate modifications made to the report to ensure compliance with the identified rules.

The list server 34 and a preferred rule organization will be discussed with respect to FIG. 3. Trading restrictions can be specified in a number of control lists 36. For example, a publicly available restricted trading list 36.1 can be provided to indicate restricted transactions which are due to factors known to the public. A "grey" list 36.2 can specify restricted securities based on factors that the company has not yet made public, such as preliminary merger talks. The grey list 36.2 will generally be confidential to the company and, in whole or part, to various company employees and clients. List entries will typically specify an issuer and the type of security at issue and will have a list entry ID. List entries can also contain an indication of the reason for placement on the list, such as merger, offering, tender offer, advisory opinion, and the like. Various formats are possible and additional can be included in accordance with various design and implementation considerations.

In a particular implementation, specific types of securities are assigned ID numbers. Restrictions can then be specified at various levels of granularity by placing the appropriate ID number (along with other restriction-definition data) in the appropriate restriction list. For example, if the company is restructuring a particular debt offering for a client corporation, the company can restrict the trading of a specific class of bonds issued by the client by placing the unique identifier of that bond in an appropriate control list while not imposing any restrictions on trading of common stock. To restrict transactions in al securities for a given corporation, each unique identifier can be separately added to the list. Alternatively, security issuers and other entities of interest can also be assigned ID numbers and the issuer ID added t a control list.

The list server 34 is connected to the various control lists 36, either directly or through an appropriate network connection. The list server is configured to process the restriction information from the control lists 36 and, in response t a query, return a list of restrictions specified for a specified instrument or company. In a most preferred embodiment, each list entry returned as a query response is in the form:

| issuer | type | list ID | list entry ID | reason |
| --- | --- | --- | --- | --- | where issuer indicates the issuer of the security, type represents the types of instruments to which the restriction applies, such as equity, derivative, debt, and all, and is preferably bit-mapped field, list ID indicates the source list for the restriction, list entry ID indicates the record in the specified list, and reason identifies the reason the restriction was imposed.

In order to improve response time, the list server 34 can include a list cache 35 which is used to store restrictions obtained from the control lists 36. While the cache can reflect the restrictions in the form they are stored in the lists, the listed restrictions are preferably processed before being cached in order to combine related restrictions, perhaps from multiple lists, into a format which can be efficiently searched and updated. For example, the restrictions can be stored in a tree-format in which the highest level is the issuer and the details about restrictions on securities by that issuer, including the list where the restriction is present and other data, are contained in descendant nodes. Other formats can also be used, such as structured data objects, and various possible implementations will be known to those of skill in the art.

Restrictions can be imposed on behalf of the company for a number of reasons, such as to comply with securities law or company policy regarding appearances of impropriety. Preferably, at least some of the restrictions are assigned an associated severity level which indicates how strictly or against which classes of parties the restriction is to be enforced. When multiple restrictions are in place for a given instrument, the list server 34 can limit the number of restrictions to be considered by returning only restrictions having a minimum severity level or only the most severe restriction. In a specific embodiment, when more than one restriction on a given instrument is present in the same control list, the list server 34 will return only the restriction having the highest severity level from that list. Because which list a restriction appears in can effect whether a given party is in compliance, in this embodiment, if a restriction is present in more than one list, the most severe restriction from each list is returned.

A low severity restriction can be provided to indicate that the restriction applies to some types of parties, such as employees, while other parties, such as clients, are not bound by the restriction. A restriction with a high severity can apply to all parties. A medium severity level can also be provided to indicate that a compliance decisions are conditional on certain restrictions being met. For example, if, after applying the applicable compliance rules, a proposed transaction is rejected on the basis of a medium severity restriction, the compliance system can indicate that the transaction is conditionally approved pending review by a TCO or impose other restrictions, such as a delay before the trade is executed or a minimum hold time.

Various mechanisms are available to maintain the control lists 36. Generally, a list maintenance system 44 is provided to interface with the control lists 36 and allow operators to create, modify, and remove restrictions from each of the lists at issue. Because the mere presence of a restriction in a control list may suggest activities which are confidential, the list maintenance system 44 can include appropriate security systems to restrict access to authorized operators.

When the list server 34 maintains a list cache 35 of the specified restrictions, it needs to be informed when updates to a control list 36 are made. Preferably, the list maintenance system 44 generates an update cache message or signal which will indicate to a list server 34 that restriction data has changed and the cache should be updated accordingly. The message can contain the complete updated data or indicate the records in the control list(s) which are affected and the list server 34 can retrieve the updated restriction accordingly. A list server updater 46 can be placed between the list maintenance system 44 and a list server 34 and configured to update multiple list servers. This configuration increases the ability to implement multiple instances of the compliance system and helps keep multiple list servers 34 synchronized with the control lists and each other.

Figure 3:
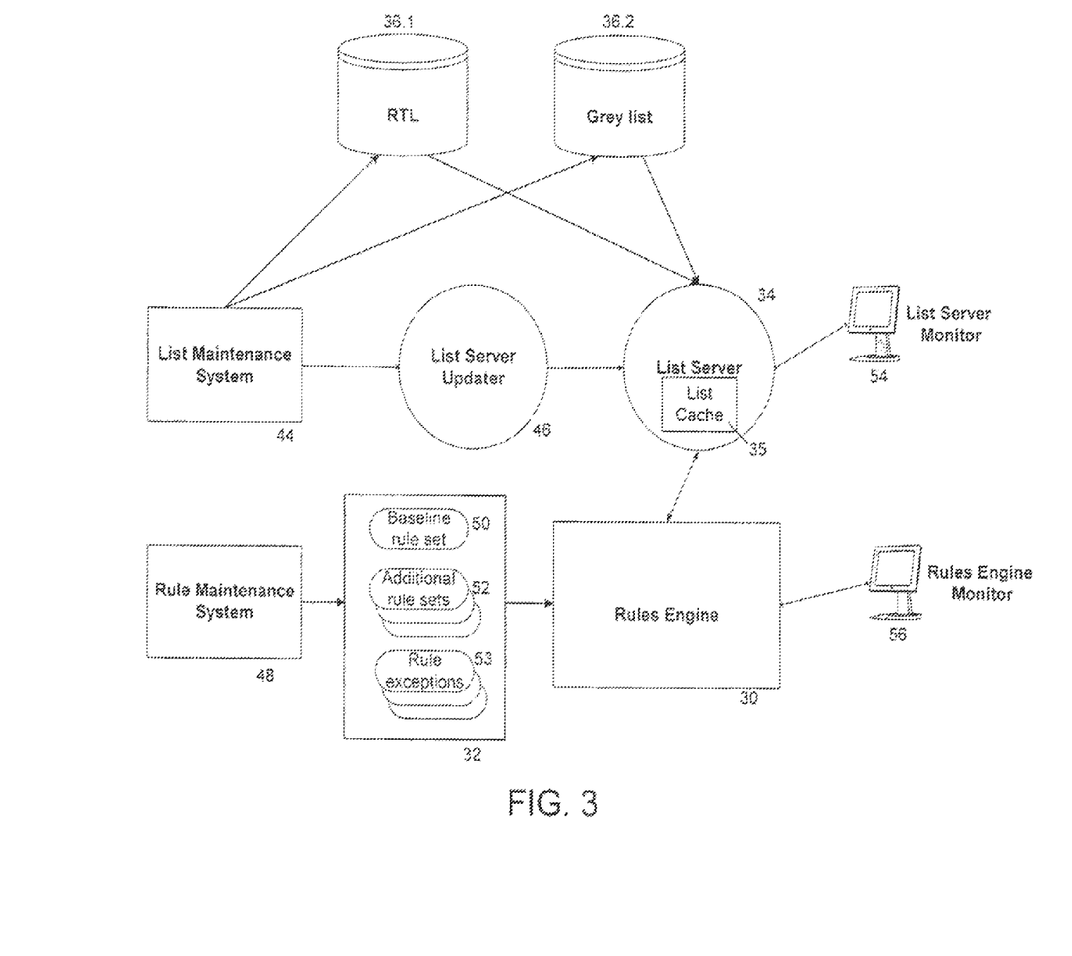
FIG. 3 is a diagram showing the list server, rules engine, and related functional and data elements.

Also illustrated in FIG. 3 is a preferred arrangement for organizing the compliance rules. Compliance rules can be expressed in a variety of ways and levels of complexity. Preferably, the compliance rules are expressed as logical statements or expressions which can be evaluated using a suitable interpreter or meta-data "templates" which can be used to generate a suitable method for evaluation. A simple rule can indicate that a trade of security X is not permitted if security X appears on a restricted trading list. A more complex rule can require evaluation of multiple factors, both factual and temporal, e.g., for rules which limit the frequency of actions or impose time restraints or delays. The particular rule processing engine used is dependent upon the manner in which the rules are implemented and various conventional rule-evaluating computational platforms can be adapted for use in the present invention. Alternative representations and rule processing systems can also be used, including various "smart" or artificial intelligence systems. For example, in one embodiment, a rules generator can be provided through which the TCO's can "Train" the compliance system 14 to make a particular determination given a set of facts relating to a request.

In a preferred implementation, a number of compliance rules are stored in the rules database 32. When evaluating a transaction for compliance, only a portion of the various compliance rules may be applicable for the party at issue. Accordingly, prior to evaluating the compliance rules, a compliance rule set can be generated which identifies those rules that apply to the party of interest. (While the rule identification will generally be a reference to a unique "rule ID" or other pointer, the compliance set could also contain the actual rules themselves and, for the purposes of the present specification and claims, "identification" should be viewed as encompassing all manner of representing the rules in the compliance set.)

A number of number of rule "sets" can be defined which identify particular groups of rules that apply to specific parties or under given circumstances. The sets can identify the rules by referencing a uniquely assigned rule ID, by containing a data link to the rule, or via other mechanisms. Preferably, a baseline rule set 50 applicable to all parties or broad classes of parties, such as employees or clients, is defined along with one or more additional rule sets 52 which contain rules applicable to narrower classes, such as divisions and departments, and possibly even a specific individual. Each additional rule set can be associated with a profile characteristic, such as a type of employee, department of employ, etc. During a compliance check, the baseline rule set and various additional rule sets, as appropriate, are identified based upon the party's profile. The combined collection of rules specified by the identified sets defines the compliance rule set to be used in evaluating the request.

In addition, rule exception data 53 can also be specified in one or more tables, lists, sets, etc., on a global basis or for specific party classes or individuals. The exception data, selected as appropriate for the party at issue, can be used to remove rules from the compliance rule set prior to evaluation. Rules can be removed from the set either explicitly, by tagging the rule to prevent its evaluation, or by other mechanisms as appropriate for the implementation of the rule processor in the rules engine 30. Exceptions can be time limited such that a specified rule suspension will expire after a specified period of time.

As in the list server 34, the rules engine 30 can also include an internal cache to store frequently accessed rules. A rule maintenance system 48 can be provided to allow the rule definitions, as rule sets, or the exception data to be modified as needed and can also send a rule update signal or message to the rules engine when rule changes are made to signal that a cache update may be necessary. Advantageously, the dynamic rule set generation process implemented in the present invention allows rule changes to be immediately used in the compliance processing.

Various systems can be provided to monitor the status of the compliance system 10. In a particular embodiment, a list server monitor 54 and a rules engine monitor 56 can be provided to monitor the status and statistics of the list server 34 and the rules engine 30, respectively. These monitors 54, 56 can also include functions to dynamically update list and rule parameters and can be implemented as independent modules or implemented as part of the list maintenance system 44 and rule maintenance system 48.

When a compliance request is evaluated and it is determined that the request is not in compliance, a rejection message can be sent to the requestor. If the rejection is due to publicly known restrictions, a full explanation can be provided. However, if the rejection is due to restrictions that are confidential, often the party can only be told that their request was rejected on policy grounds or another non-specific reason.

According to a further aspect of the invention, each compliance rule has an associated priority which indicates an order in which the rules in the compliance rule set are evaluated by the rules engine 30. The priority can be used to ensure that one class of rules is evaluated before rules in another class. When a transaction can be rejected for multiple reasons, it is efficient that evaluation of the compliance rules in the compliance set be halted when an evaluated rule indicates that a request is not approved. Under these circumstances, it is beneficial that the rules be evaluated in an order which provides that a "full explanation" rejection occur before a rejection based on confidential information. Accordingly, in a most preferred embodiment, rules which relate to restrictions in a public list, such as a restricted transaction list 36.1 are given a higher execution priority than rules which evaluate confidential restrictions, such as those in the "grey" list 36.2. Priority can be specified on a rule-by-rule basis, according to various classes, on the basis of which control list(s) the rule addresses, or using other manners.

Figure 4:
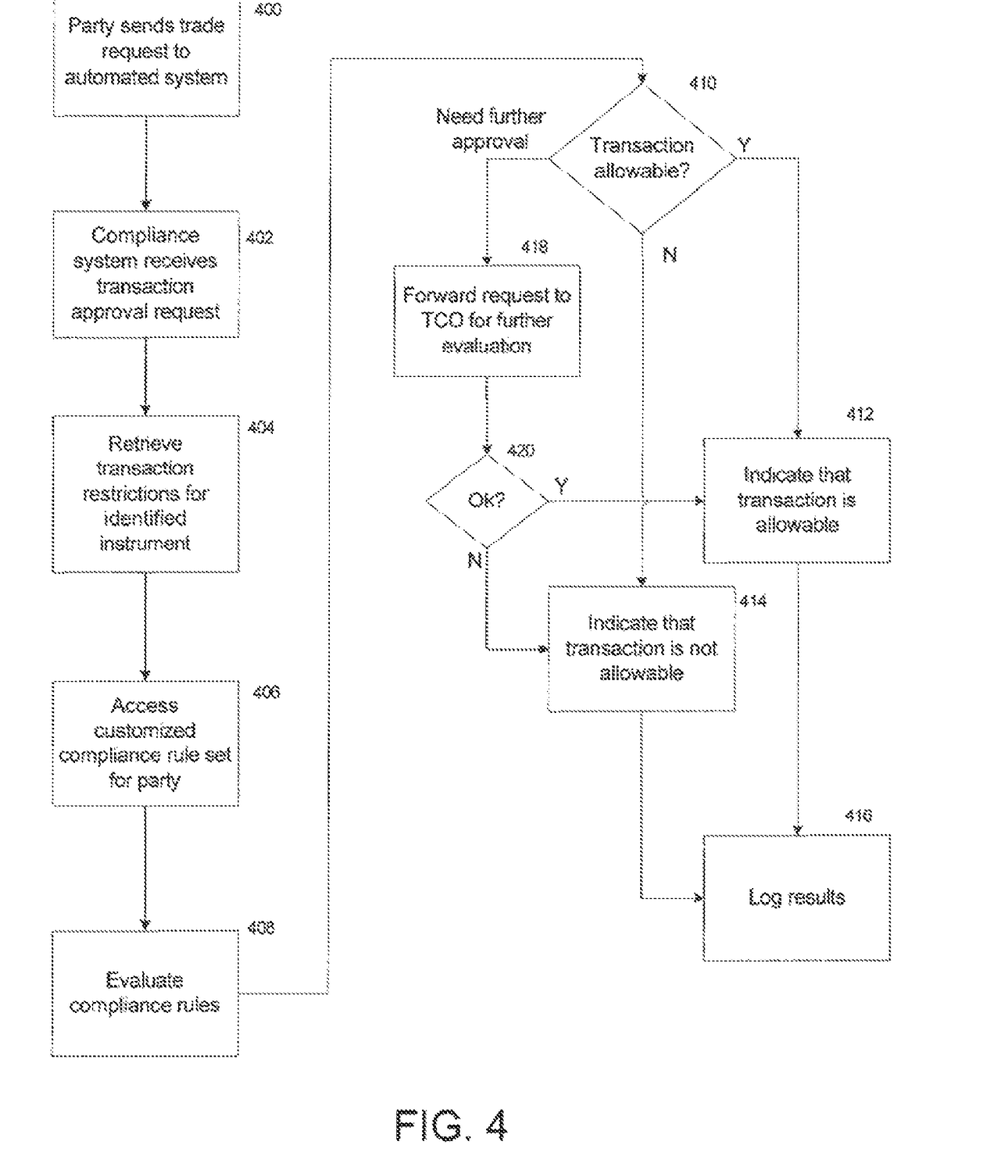
FIG. 4 is a high-level flowchart of the basic method executed by the compliance system.

FIG. 4 is a high-level flowchart of the basic method implemented in the compliance system 10 and which is discussed above. Initially, a party sends a compliance request, such as a request to verify transaction compliance to the compliance system (Step 400). The request (indicating a financial instrument and the party to the transaction) is received at the compliance system (step 402). The request can be sent directly from the party or generated internally within a trading system used by the party.

The compliance system then retrieves transaction restrictions related to the identified instrument, e.g., by issuing a query to the list server 34. (Step 404). A compliance rule set for the party is then accessed or generated as required with consideration of the relationship between the party and the entity and possibly other profile factors. (Stem 406). For example, if the party is specified indirectly by means of a transaction account, the account number can be used to access an account database to determine if the account is for an employee of the company, a customer, or for the company itself. This account information can then be used to access additional information and retrieve the profile information and determine the contents of the compliance set.

The compliance rules are then evaluated (step 408), preferably in order of a specified rule priority. The results of the evaluation are examined (step 410) and an indication is provided, for example in an e-mail message to the party, whether or not the request is in compliance (step 412 if allowable, step 414 if not allowable). If the request does not comply, the message can also include an explanation for the rejection, perhaps selected from a predefined list of approved reasons. After a final allowability determination has been made, the results can be logged (step 416).

In some situations, the compliance rules can indicate that the transaction or other request is rejected but that the rejection could be overridden by a TCO or that approval is conditional upon a confirmation by a TCO. Alternatively, the proposed request may be too complex to provide a reliable rules-based analysis. Under such circumstances where further approval may be needed, the transaction request and related information can be forwarded to a TCO (step 418) and a suitable message sent to the party who made the request. The TCO can then make their own evaluation (step 420) and enter an approval or disapproval into the system 10 which could then be processed and logged as appropriate (e.g., by executing steps 412 and 414 for a TCO approval or disapproval, respectively).

According to yet a further aspect of the invention, the compliance system 10 can include additional functionality to analyze rejected requests and inform the requestor when conditions have changed and the request is allowable. In particular, the rules engine 30 can be configured to periodically examine logged requests where a determination has made that the request s not in compliance and re-execute the compliance proves for those requests. If the re-execution indicates that a particular logged request is permitted, a message can be sent to the request issuer indicating the changed conditions.

This "retry" function can be automatically enabled for rejected requests. Alternatively, when a party is informed that their request is not in compliance, hey can be given the option of requesting a notification of allowability. The option can be exercised by sending an appropriate e-mail response to the rejection notice or by other means. Retrys can be time limited and expire after a specified period of time.

Figure 5:
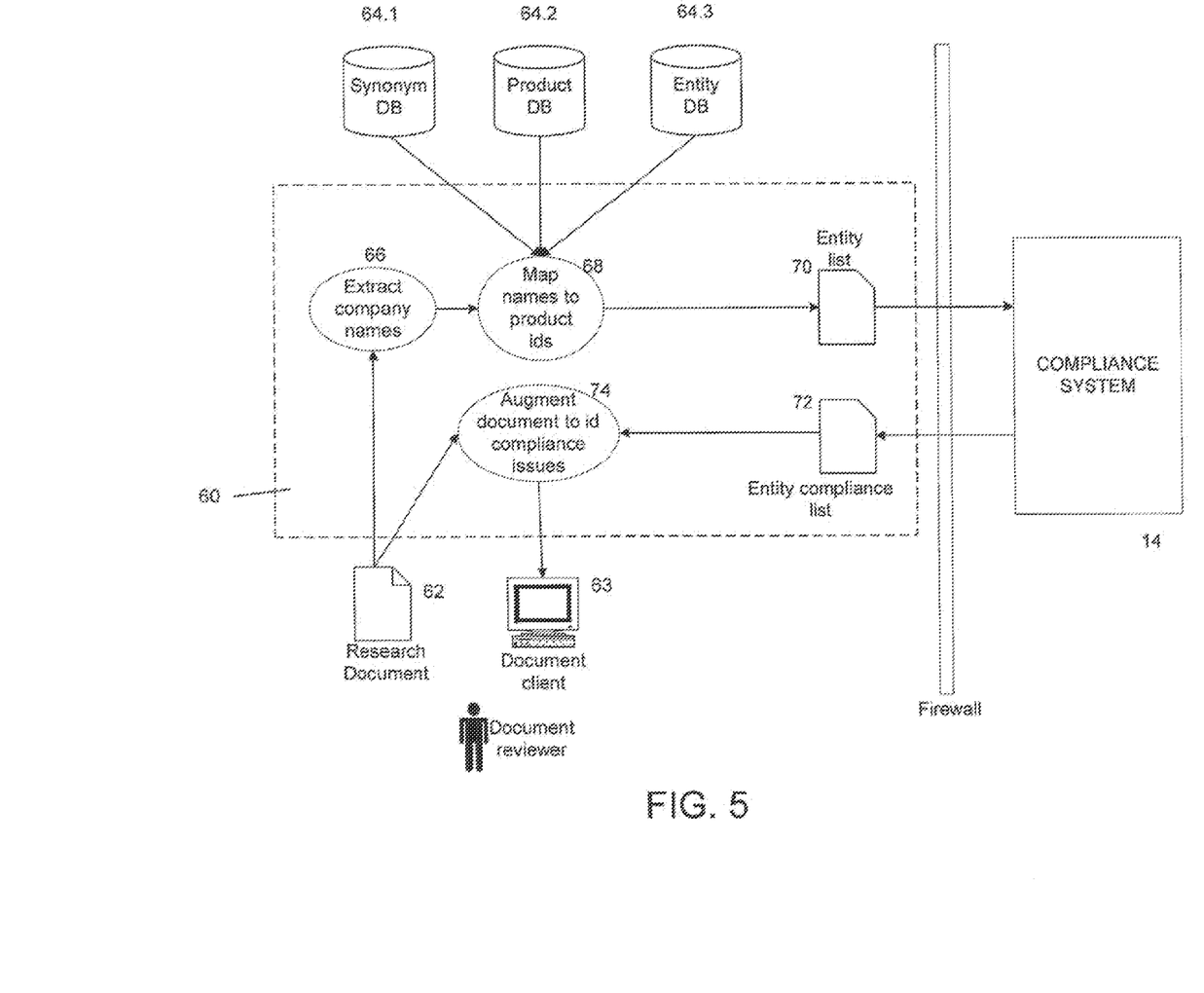
FIG. 5 is a block diagram illustrating a report compliance verification system according to a further aspect of the invention.

In addition to performing transaction compliance checks, a company must ensure that publicly released research documents or other publications do not contain confidential information. FIG. 5 is a block diagram illustrating a report compliance verification system and data flow in accordance with a variation of the present invention which can be used to perform this additional type of compliance request checking. The system comprises a document processor 60 which is coupled to the compliance system 14 and receives a research document 62 as input.

A first software module 66 extracts company names from the document 62. A mapping module 68 then maps the extracted names to product identifiers. The mapping is performed with reference to one or more mapping databases 64 containing appropriate data, such as a synonym database 64.1, a product database 64.2 and an entity database 64.3. The mapping process produces an entity list 70 which identifies entities that are associated with the information in the document 62.

The entity list 70 is then input to the compliance system 14, either as a whole or via individual requests for each entry in the list. The listed entities are processed in a manner which is similar to the processing of transaction compliance requests wherein the "party" can be considered to be the company itself or the research department. The results of the compliance analysis can be complied in an entity compliance list 72. The list will identify which company names and/or mapped identifiers have associated trading restrictions based upon confidential information. Suitable compliance rules can be generated for use in this process, which rules may be different from those used during transaction compliance checks.

Identified restriction issues in the entity compliance list 72 are then returned to a document reviewer, e.g., through a document client 63. Preferably, a suitable merge module 74 is provided to augment the content of the research document 62 with the list entries in order to highlight company names with associated compliance issues in the document itself. In one embodiment, details regarding the type of compliance issue raised by a reference in the document 62 are inserted as hyper-linked meta-data which can be accessed by clicking on the highlighted text. The author of the document or other document reviewer can then easily review and revise the document 62 as needed to address the indicated compliance issues. The revised document can be resubmitted until no compliance issues remain. Appropriate techniques for implementing the document processor 60 and its component elements will be known to those of skill in the art.

The invention can be implemented using conventional digital electronic circuitry or in computer hardware, firmware, software, or in combination of these technologies. Apparatus of the invention can be implemented in a computer program product tangibly embodied in machine-readable storage device for execution by a programmable processor. Method steps of the invention can be performed by a programmable processor executing a program of instructions to perform functions of the invention by operating on input data and generating output.

The invention can also be implemented in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. The computers in the automated transaction compliance system can be connected to each other by one or more network interconnection technologies. Additionally, the functions associated with separate processing and database servers can be integrated into a single server system or may be partitioned among servers and database systems that are distributed over a wide geographic area.

Throughout the application, reference has been made to a corporation or corporate entity. In typical circumstances, the corporation will be a bank, brokerage house, or other financial service provider. However, the invention is not so limited and references to a corporation or entity should be construed as applying to any type of businesses, public or private, in various forms regardless of whether it complies with a specific legal definition of a corporation, as well as to government agencies, legal institutions, and other organizations which gain access to information or establish relationships that influence permissible financial transactions made by those associated with the organization. Some examples of such other organizations in which the present invention can be implemented include law-firms, government agencies, such as the FDA and political organizations.

A number or embodiments of the present invention have been described. Nevertheless, it will be understood that various modifications may be made without departing from the spirit and scope of the invention.

What is claimed is:

1. A computer implemented method for performing compliance checking on a request associated with a party to determine if, in view of a relationship between the party and an entity, the request complies with specified restrictions, the method comprising the steps of:
   receiving by a computer compliance system a compliance request identifying the party and a particular instrument associated with an issuer;
   receiving by the computer compliance system restrictions associated with the particular instrument;
   receiving profile information reflecting at least the relationship between the associated party and the entity;
   selecting by the computer compliance system at least one applicable compliance rule from a compliance rule set, wherein the applicable compliance rule is selected based on the party's profile information;
   dynamically updating a baseline rule set, an additional rule set and a rule exceptions set via the compliance rules engine;
   applying via the computer compliance system the applicable compliance rule to determine when the compliance request complies with the restrictions; and
   generating a response message comprising results of the compliance request rules application.

2. The method of claim 1, wherein each compliance rule in the compliance rule set has an associated priority, the priority indicating an order in which the rules are applied.

3. The method of claim 2, wherein the restrictions are indicated in a plurality of lists including a first list indicating restrictions related to publicly available information and a second list indicating restrictions related to non-public information, the priority of rules applying to the first list being greater than the priority of rules applying to the second list.

4. The method of claim 1, wherein:
   the restrictions are indicated in at least a first list and restrictions in the first list have an associated severity level; and
   receiving by the computer compliance system restrictions comprises receiving restrictions from the first list wherein, if a plurality of restrictions associated with the particular instrument is in the first list, receiving from the first list only the restriction associated with the particular instrument having the highest severity level.

5. The method of claim 1, wherein restrictions are transaction restrictions and each restriction has an associated severity level selected from a group comprising at least one of a low severity indicating that transactions are permitted for a party in a first category and not permitted for a party in a second category, and a high severity indicating that transactions are not permitted for any party.

6. The method of claim 5, wherein the first category comprise customers of the entity and the second category comprises employees of the entity.

7. The method of claim 5, wherein the severity group further comprises a medium severity indicating that transactions are permitted only with additional approval.

8. The method of claim 1, wherein the compliance request is received from the party and the message is sent to the party.

9. The method of claim 1, wherein the compliance request is received from an electronic trading system and the output message is sent to the electronic trading system.

10. The method of claim 1, further comprising:
logging compliance requests where a determination is made that the compliance request violates the restrictions;
re-executing the querying, retrieving and processing on a periodic basis for logged requests;
if a re-execution indicates that a particular logged request does not violate the restrictions, outputting the compliance request response message indicating the compliance request approval.

11. The method of claim 1, wherein the entity comprises a company and the party comprises one of an employee of the company, a customer of the company, and the company.

12. The method of claim 1, wherein the compliance request comprises an electronic document containing data indicating a company name;
the method further comprising:
extracting the company name from the document and mapping the extracted company name to an associated instrument.

13. The method of claim 12, further comprising:
embedding the compliance condition message in a representation of the document.

* * * * *